United States Patent [19]

Svalbe

[11] 3,769,609

[45] Oct. 30, 1973

[54] PULSE WIDTH MODULATOR, AN ELECTRICAL CIRCUIT DEVICE TO MODULATE WIDTH OF ELECTRICAL SQUARE SHAPED PULSES

[75] Inventor: John Svalbe, Los Angeles, Calif.

[73] Assignee: Magnetic Electronics, Inc., Los Angeles, Calif.

[22] Filed: Oct. 28, 1971

[21] Appl. No.: 167,259

[52] U.S. Cl......................... 332/12, 307/265, 328/58

[51] Int. Cl............................................. H03k 7/08

[58] Field of Search......................... 332/12; 328/58; 307/265–267; 325/142; 318/341

[56] References Cited

UNITED STATES PATENTS

| | | | |
|---|---|---|---|
| 2,990,516 | 6/1961 | Johannessen | 332/12 X |
| 3,384,838 | 5/1968 | Knutrud | 307/265 X |
| 2,845,588 | 7/1958 | Sampietro | 318/341 X |
| 3,334,292 | 8/1967 | King et al. | 307/265 X |
| 2,926,311 | 2/1960 | Gabor | 332/12 X |
| 3,551,851 | 12/1970 | Engel | 307/265 X |

*Primary Examiner*—Alfred L. Brody

[57] ABSTRACT

Pulse Width Modulator, an electrical circuit device to modulate width of electrical square shaped pulses under influence of magnetic field, said device comprising two saturable magnetic cores, each core surrounded by windings, each winding having diode in series and both said core-windings-diodes elements binded or surrounded firmly by control elements, whereby supplied square shaped pulses on windings with diodes are transferred to consumption circuit distorted into parts substantially independent from original.

1 Claim, 17 Drawing Figures

INVENTOR
JOHN SVALBE

INVENTOR
JOHN SVALBE

*INVENTOR*
*JOHN SVALBE*

INVENTOR
JOHN SVALBE

INVENTOR
JOHN SVALBE

INVENTOR
JOHN SVALBE

PULSE WIDTH MODULATOR, AN ELECTRICAL CIRCUIT DEVICE TO MODULATE WIDTH OF ELECTRICAL SQUARE SHAPED PULSES

This invention, a Pulse Width Modulator, generates positive pulses, negative pulses or alternate polarity pulses. Pulse width is controlled by microampere range D.C. current(s) in one or indefinite number of control circuits. Control circuit(s) may be electrically isolated from each other as well as from consumption circuit(s). The generated pulse power, supplied to the consumption circuit has amplification value many thousands to many millions times greater than that of control power.

This invention improves the application of high speed power transistors in circuits which use pulses on the transistor base whose width is controlled by D.C. signal(s). The Pulse Width Modulator simplifies electronic circuits because the number of otherwise necessary active and passive components is reduced drastically. Consequently, this invention decreases total product weight, reduces production costs and improves reliability.

This Pulse Width Modulator offers flexibility in application because any signal polarity can provide to the consumption circuit positive (+) or negative (−) polarity output pulses which can be in the form of two terminal output, three terminal center tap output, or two isolated outputs each having two terminals. It can be used in other fields besides power circuit applications. For instance, it is applicable for switching and amplification and differential amplification with sensors in pollution control instrumentation. Successful use of this invention can be made in electronic circuits generating mathmatical functions such as addition, subtraction, multiplication, division, squaring and square root extraction. Exhibits marked FIGS. 4 to 17 inclusive show how flexible this invention is by appropriate interconnection of the Pulse Width Modulator to power supply and consumption circuits.

The present known pulse width modulator designs are complicated and crowded with many active and passive electronic components and performance is restricted to one input-output mode. Most of the present known pulse width modulators require more control power than supplied output pulse power to the consumption circuit. Another disadvantage of most present known pulse width modulators is poor signal isolation from output pulses.

The object of this invention is to provide an electronics component which would improve present control circuits in the following ways:

1. Increase reliability of circuits.
2. Decrease quantity of active and passive components.
3. Decrease weight of the total product.
4. Decrease size of circuits.
5. Offer fast frequency response.

These objectives are achieved by the following characteristics of this invention:

1. Electrical pulse width modulation where pulse repetition rate is in kilohertz (KHz) to megahertz (MHz) range, depending on particular design and materials used.
2. Pulse width is controlled by either D.C. current or D.C. voltage.
3. High gain pulse power amplification.

4. The output(s) on consumption circuit(s) is controlled by indefinite number of input or control circuits.
5. The control circuit(s) is electrically isolated from the output circuit(s).
6. All control circuits are electrically isolated with respect to each other.
7. Flexibility in output pulse mode is achieved because different output pulse modes can be obtained from any polarity control current.
8. Pulse width is controllable by control circuits(s) from zero width, which represents zero output on consumption circuit, to approximately 95 percent of the duration as determined by the repetition rate.
9. Indefinite number of output pulse patterns are obtainable.

A general description of the exhibits marked FIGS. 1 through 17 is as follows:

Figure 1:
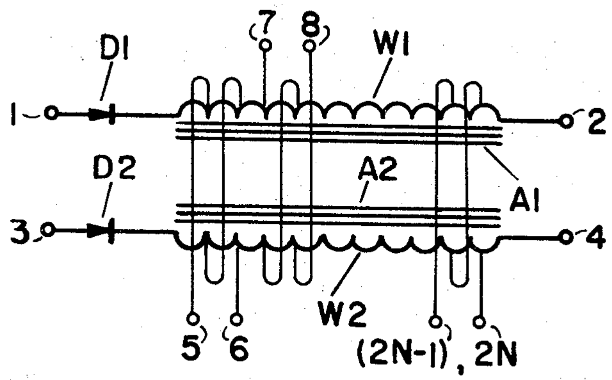
FIG. 1 is a basic illustration of the invention called Pulse Width Modulator used in conjunction with a square wave power supply. Only one power winding W is shown in this figure for each core, however an indefinite number of power windings with diode in series can be applied.

In the following descriptions of FIGS. 3 through 17:

Outputs $E_{3-4-5}$ and $E_{6-7-8}$, generated from power supply B, are equal with respect to magnitude and polarity. Output $E_{3-4-5}$ is electrically isolated from output $E_{6-7-8}$.

Reference characters are defined as follows:

P.W.M.—Pulse Width Modulator.

$A_1$, $A_2$—Saturable magnetic cores.

B—Square wave power supply.

B*a*—Wave shape form from terminal 4 to 3 and from terminal 7 to 6 of the square wave power supply.

B*b*—Wave shape form from terminal 4 to 5 and from terminal 7 to 8 of the square wave power supply.

C—D.C. voltage source.

$D_1$, $D_2$—Diodes.

P—Pulse characteristic on consumption circuit $R_L$.

$P_1$—Pulse characteristic on consumption circuit $R_{L1}$.

$P_2$—Pulse characteristic on consumption circuit $R_{L2}$.

$R_L$, $R_{L1}$, $R_{L2}$—Consumption circuits or loads.

$R_1$, $R_2$—Current limiting resistors.

**1,2,3 . . . 2*n***—Terminal numbers.

Figure 3:
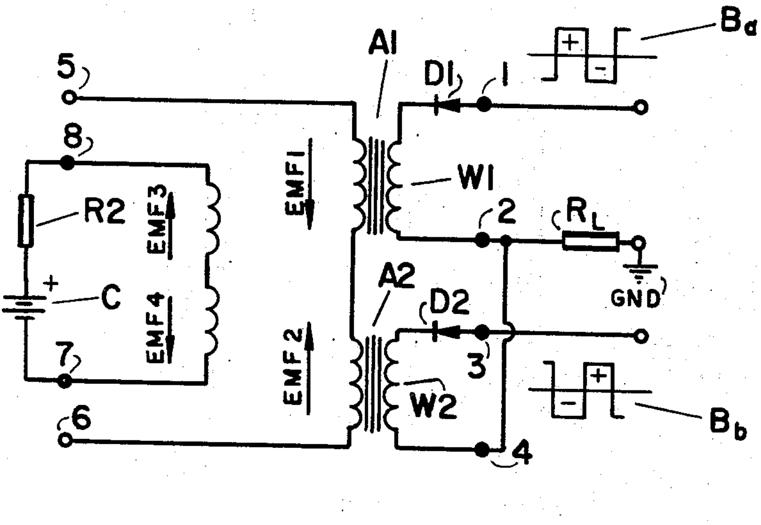

FIG. 3 represents the cancelling effect of induced electromagnetic forces in control circuit(s). This figure is used in the later explanation of the amplification phenomenon of the Pulse Width Modulator.

FIGS. 4 through 17 show seven output pulse patterns, irrespective of signal polarity, when each core has one power winding with diode in series. By placing two power windings with diodes in series on each core 28 additional basic output pulse patterns are obtained. If the number of power windings are increased to an indefinite number, an indefinite number of pulse patterns are obtainable.

Figure 4:
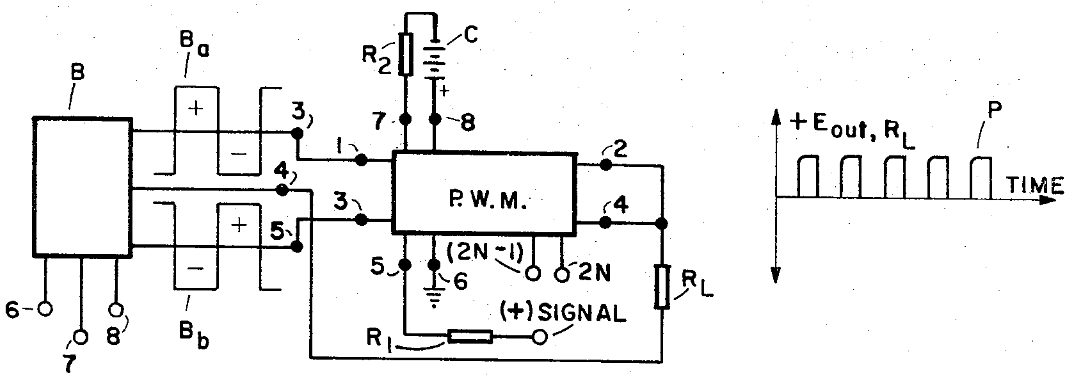

FIG. 4 is P.W.M. interconnection with power supply B for positive signal current and positive output pulses P appearing on load $R_L$.

Figure 5:
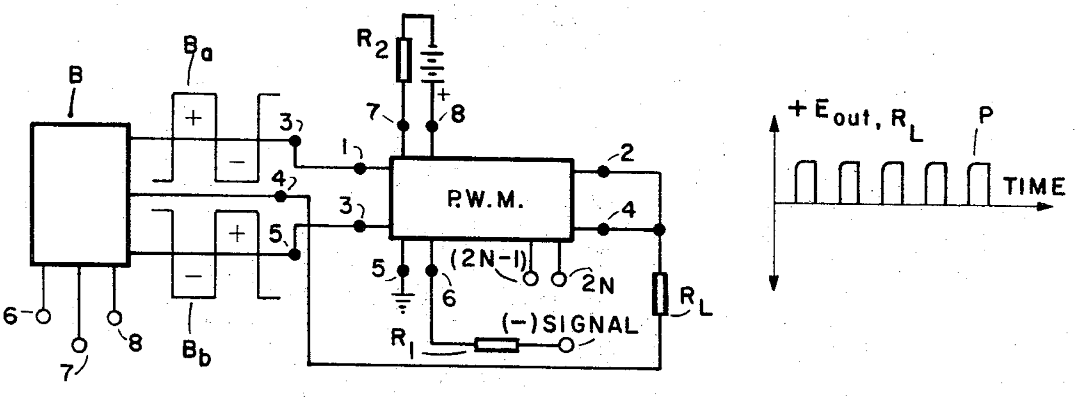

FIG. 5 is P.W.M. interconnection with power supply B for negative signal current and positive output pulses P appearing on load $R_L$.

Figure 6:
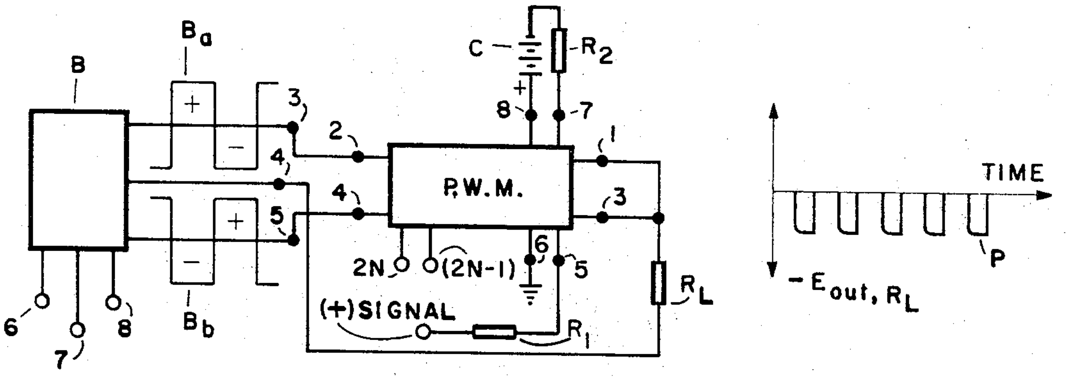

FIG. 6 is P.W.M. interconnection with power supply B for positive signal current and negative output pulses P appearing on load $R_L$.

Figure 7:
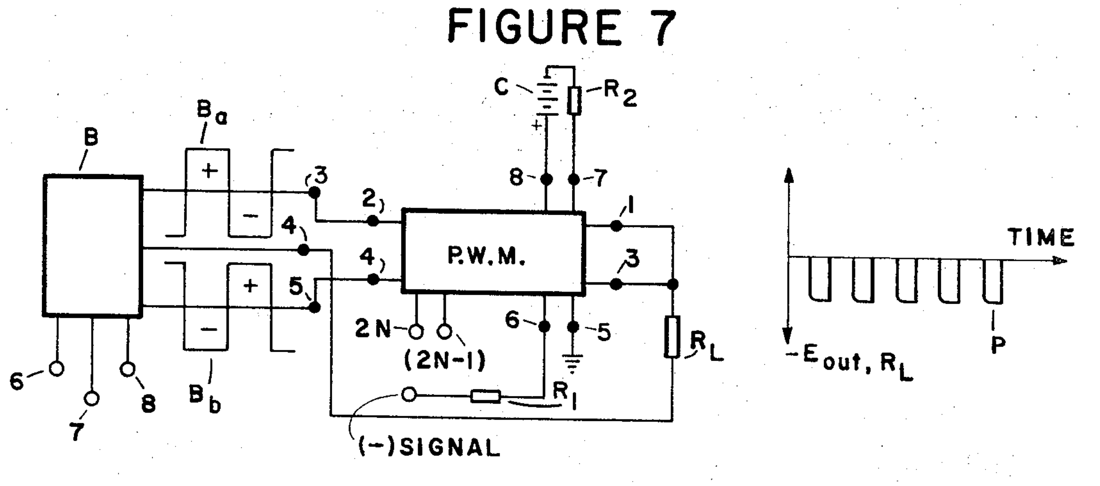

FIG. 7 is P.W.M. interconnection with power supply B for negative signal current and negative output pulses P appearing on load $R_L$.

Figure 8:
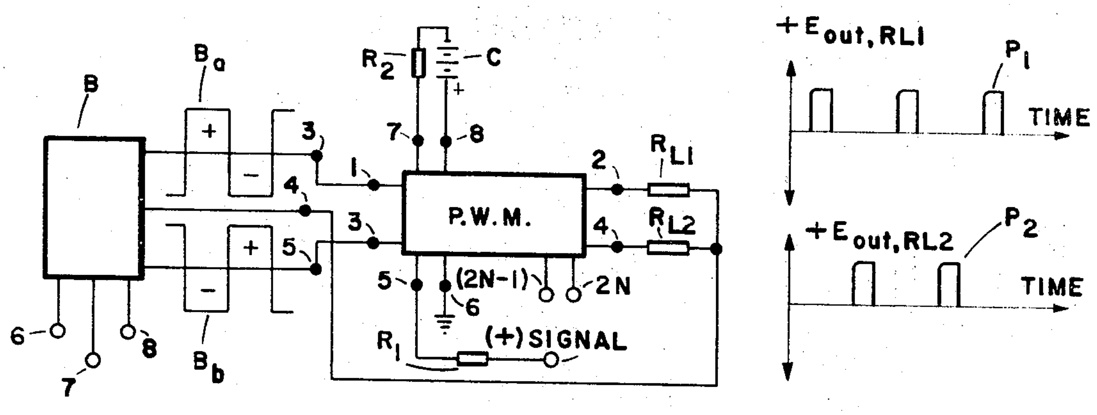

FIG. 8 is P.W.M. interconnection with power supply B for positive signal current and positive output pulses $P_1$ and $P_2$ alternately appearing on two loads $R_{L1}$ and $R_{L2}$ respectively with common return, previously referred to as three terminal center tap output.

Figure 9:
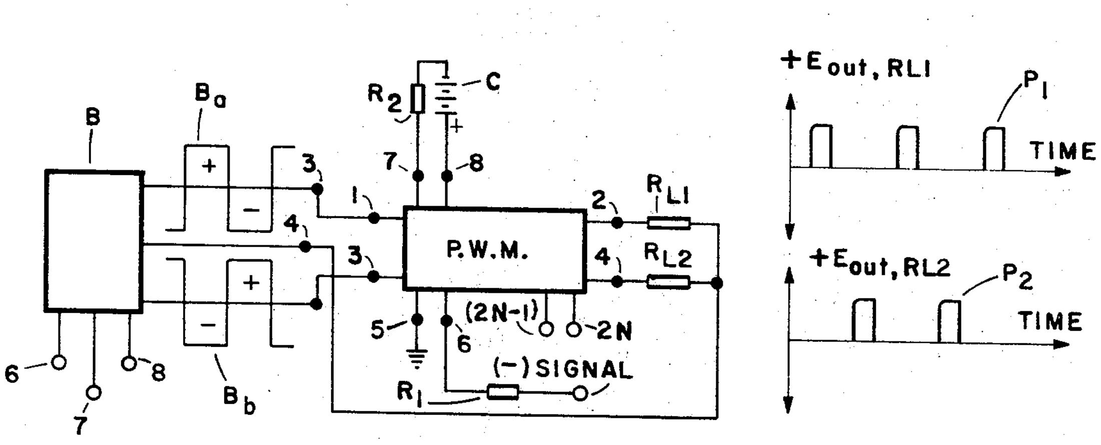

FIG. 9 is P.W.M. interconnection with power supply B for negative signal current and positive output pulses $P_1$ and $P_2$ alternately appearing on two loads $R_{L1}$ and $R_{L2}$ respectively with common return.

Figure 10:
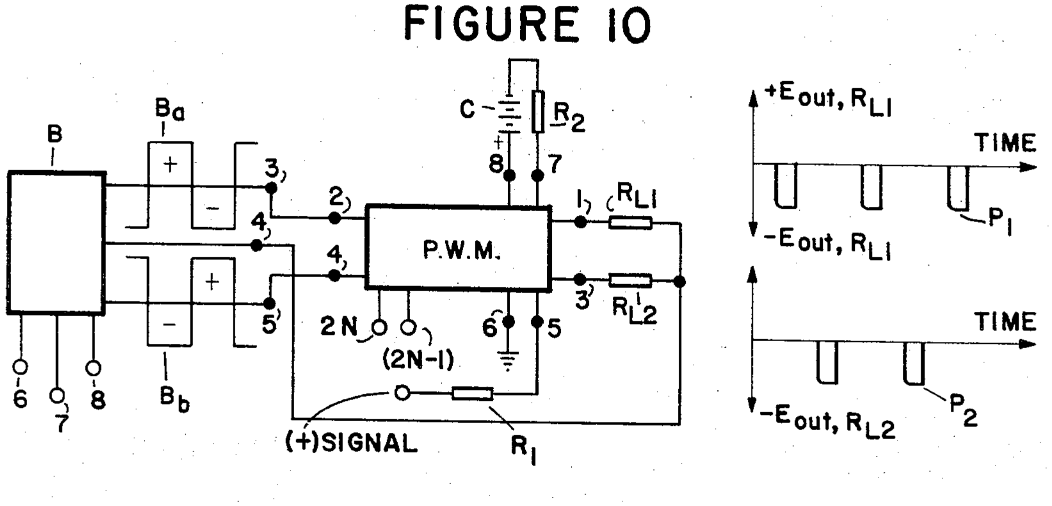

FIG. 10 is P.W.M. interconnection with power supply B for positive signal current and negative output pulses $P_1$ and $P_2$ alternately appearing on two loads $R_{L1}$ and $R_{L2}$ respectively with common return.

Figure 11:
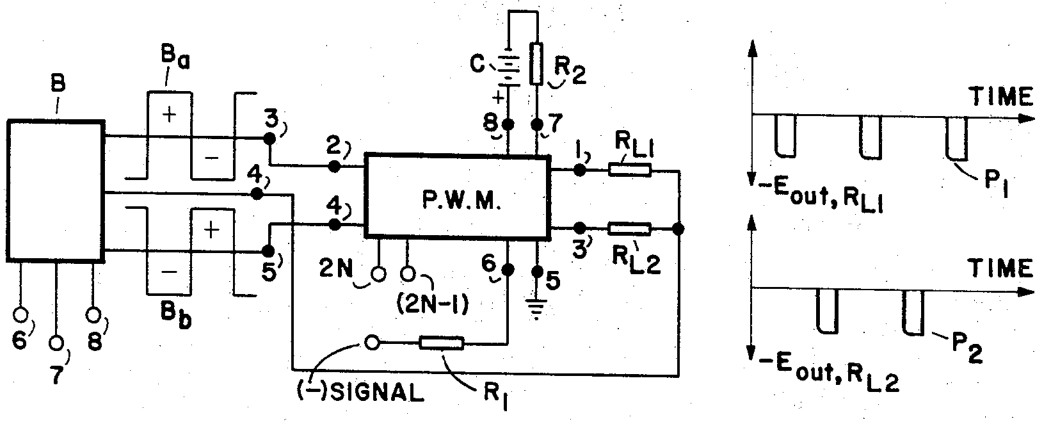

FIG. 11 is P.W.M. interconnection with power supply B for negative signal current and negative output pulses $P_1$ and $P_2$ alternately appearing on two loads $R_{L1}$ and $R_{L2}$ respectively with common return.

Figure 12:
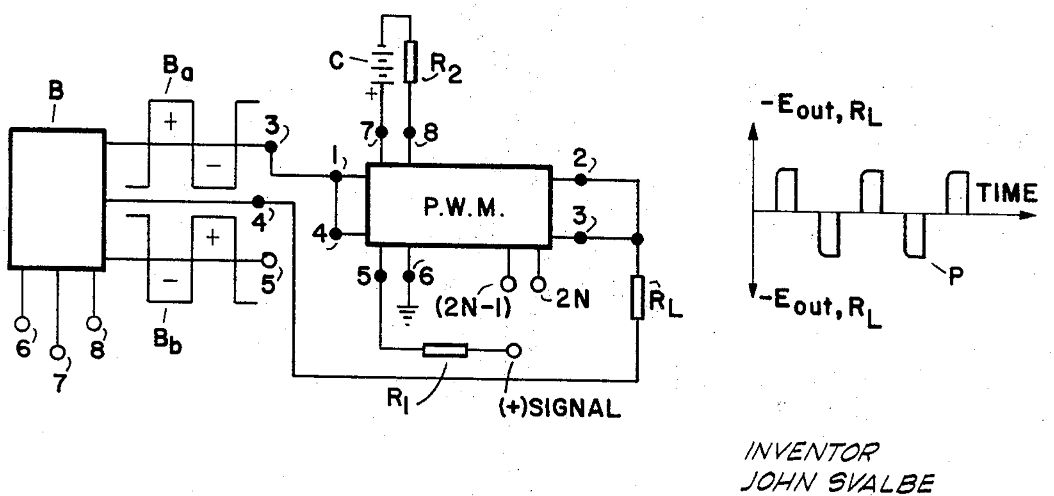

FIG. 12 is P.W.M. interconnection with power supply B for positive signal current and alternate polarity pulses P appearing on load $R_L$.

Figure 13:
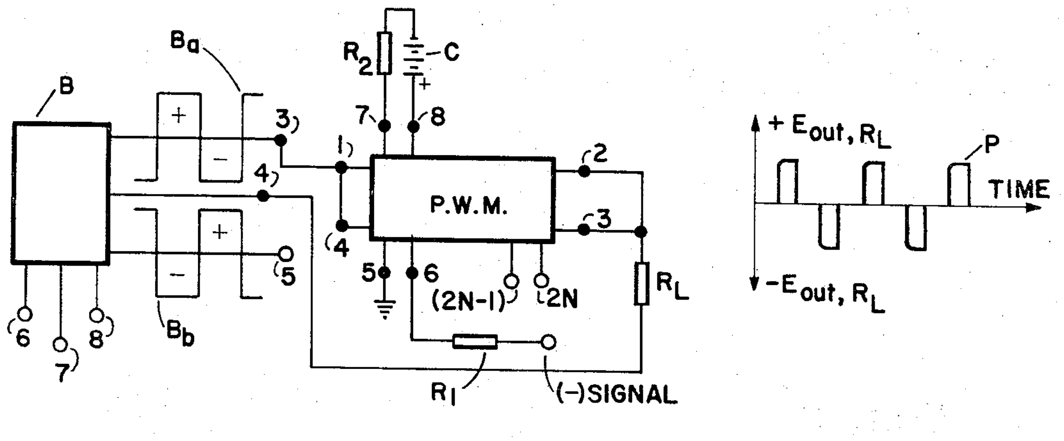

FIG. 13 is P.W.M. interconnection with power supply B for negative signal current and alternate polarity pulses P appearing on load $R_L$.

Figure 14:
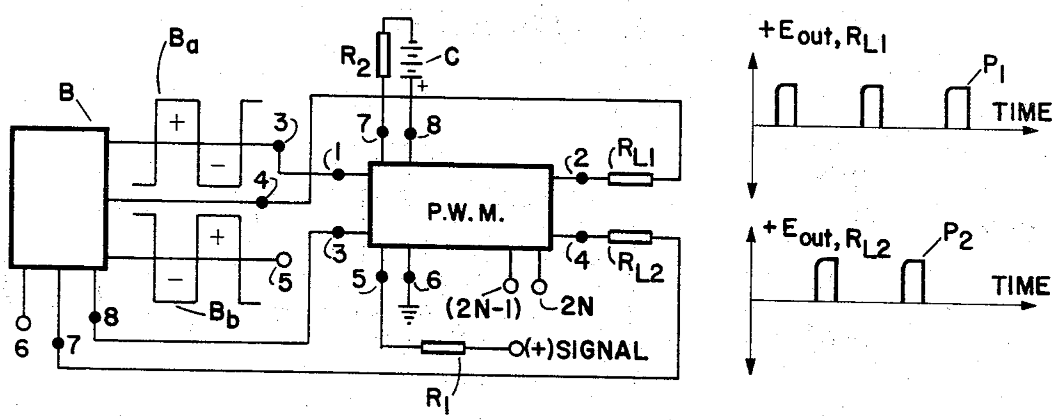

FIG. 14 is P.W.M. interconnection with power supply B for positive signal current and positive output pulses $P_1$ and $P_2$ alternately appearing on two loads $R_{L1}$ and $R_{L2}$ respectively, each load having separate return.

Figure 15:
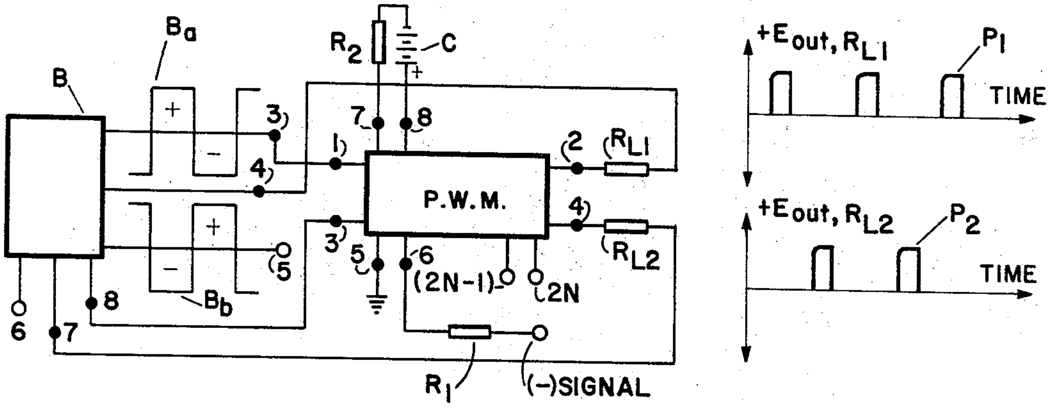

FIG. 15 is P.W.M. interconnection with power supply B for negative signal current and positive output pulses $P_1$ and $P_2$ alternately appearing on two loads $R_{L1}$ and $R_{L2}$ respectively, each load having separate return.

Figure 16:
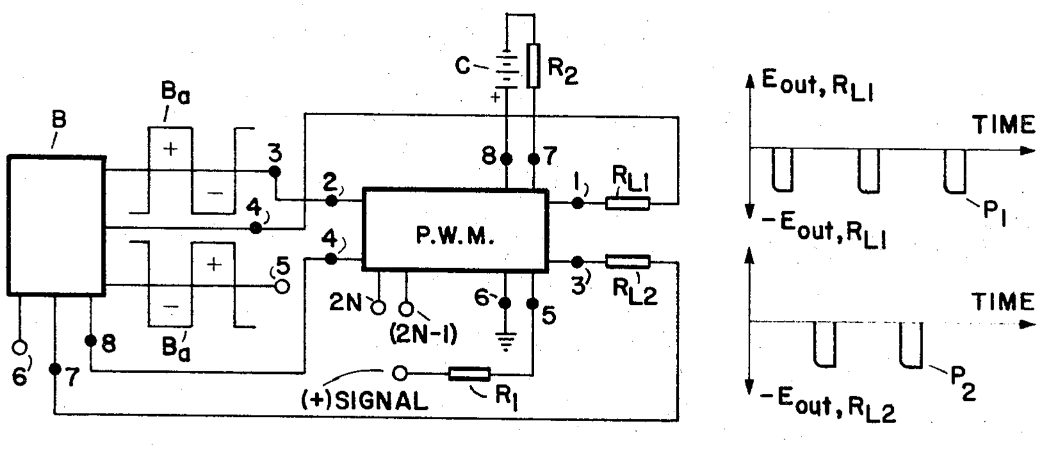

FIG. 16 is P.W.M. interconnection with power supply B for positive signal current and negative output pulses $P_1$ and $P_2$ alternately appearing on two loads $R_{L1}$ and $R_{L2}$ respectively, each load having separate return.

Figure 17:
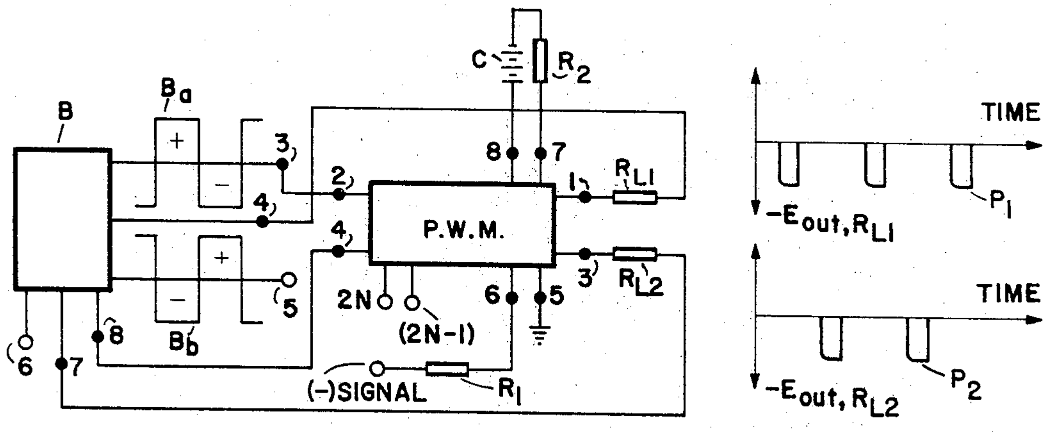

FIG. 17 is P.W.M. interconnection for negative signal current and negative output pulses $P_1$ and $P_2$ alternately appearing on two loads $R_{L1}$ and $R_{L2}$ respectively, each load having separate return.

The mechanical and electrical description of this invention is detailed as follows:

The P.W.M. consists of two saturable magnetic cores (FIG. 1), Core $A_1$ and Core $A_2$, each core characterized by high frequency capability. FIG. 1 shows Core $A_1$ with a winding designated by symbol $W_1$ and Core $A_2$ with another winding designated by $W_2$ called power windings, An indefinite number of power windings can be wound on Core $A_1$ and Core $A_2$ and each power winding has one diode in series. Terminals 1 and 2 designate $W_1$ on Core $A_1$ with Diode $D_1$ in series, and terminals 3 and 4 designate $W_2$ on Core $A_2$ with Diode $D_2$ in series. Core $A_1$ and Core $A_2$ with windings $W_1$ and $W_2$ respectively are assembled one on top of the other. Then an indefinite number of windings, herewith called control windings, are wound on this two-core (Core $A_1$ and Core $A_2$) assembly. Terminals 1 and 3 have equal polarities on diodes and windings. Terminals 2 and 4 have equal winding polarities but opposite winding polarities with respect to terminals 1 and 3.

An alternate method of assembly consists of winding $W_1$ on Core $A_1$ with diode in series, and then an indefinite number of control windings are wound on the Core $A_1$ assembly, and similarly Core $A_2$ has winding $W_2$ and diode in series, and then an indefinite number of control windings are wound on the Core $A_2$ assembly. The control windings from Core $A_1$ assembly and Core $A_2$ assembly are then interconnected in pairs in the polarities relationship which would produce an equivalent effect as described for the two core-winding-diode assemblies assembled one on top of the other. An indefinite number of power windings can be applied to the above described core-winding-diode assembly.

An indefinite number of control windings can be added to the assembly. The number of possible winding terminals has the formula $(2n-1)$, $2n$. Terminal $(2n-1)$ is an odd numbered terminal and $2n$ is an even numbered terminal, where n is equal to or larger than 3. Terminals 1, 3, 5, 7 . . . $(2n-1)$ have equal polarities to each other, but have opposite polarities to terminals 2, 4, 6, 8 . . . 2n.

Figure 2:
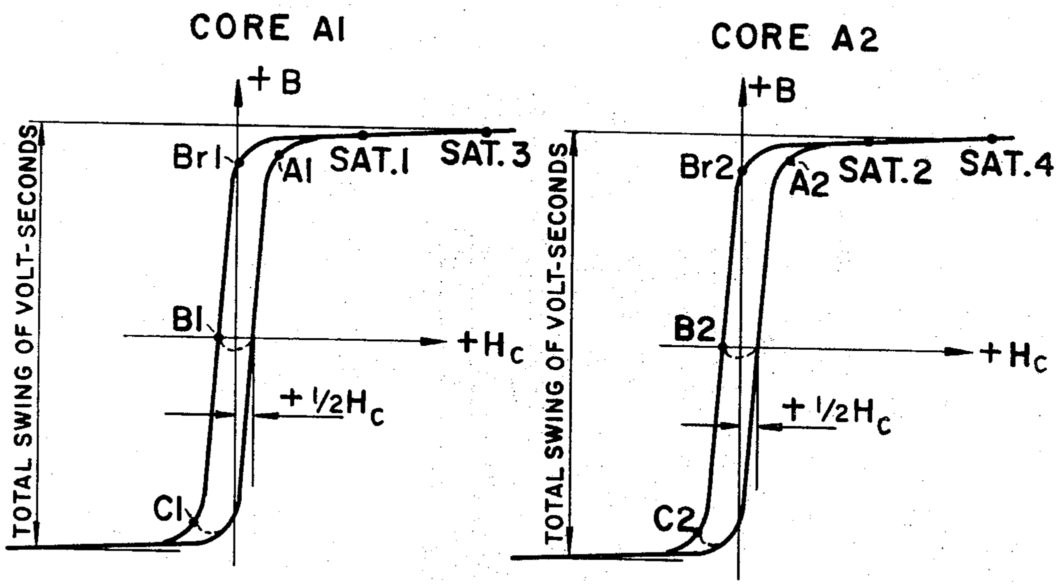
FIG. 2 is the B-H loop characteristic pertinent to the core material used in the Pulse Width Modulator. This figure also demonstrates the physical concept and theory of performance of this invention described in detail in Conditions No. 1 through No. 4 following the general description of FIGS. 3 through 17.

The theory of the Pulse Width Modulator is as follows:

CONDITION No. 1: This condition is characterized by FIG. 1. In this state power supply B is not connected to the P.W.M., and all control windings are open. FIG. 2 shows that the operating point on the B-H loop of each magnetic core is at positive reminiscence point $BR_1$ for Core $A_1$ and at $BR_2$ for Core $A_2$.

CONDITION No. 2: This condition represents physical state characterized by FIG. 4, except that all control windings are open. When the positive half cycle Ba of power supply B delivers positive volt-seconds to terminal 1, point $BR_1$ on B-H loop of Core $A_1$ proceeds toward point $SAT_3$ shown in FIG. 2. This change exercises almost zero volt-seconds swing in Core $A_1$ because the magentic core is in its saturated state as seen in FIG. 2. The supplied positive volt-seconds on terminal 1 of the P.W.M. senses only winding D.C. resistance and almost all pulse power of full duration is delivered on consumption circuit $R_L$. During this time the negative half cycle B*b* of the power supply B delivers negative volt-seconds to terminal 3 of the P.W.M. as shown in FIG. 4. However, current to the winding and to the consumption circuit $R_L$ is blocked by Diode $D_2$. During the next half cycle terminal 1 of the P.W.M. receives negative half cycle volt-seconds and current is blocked from the consumption circuit $R_L$ by Diode $D_1$. Therefore, operating point on the B-H loop (FIG. 2) of Core $A_1$ returns from point $SAT_3$ to its reminiscence point $BR_1$. In this second half cycle terminal 3 of the P.W.M. receives positive volt-seconds, and consequently, operation point $BR_2$ proceeds toward point $SAT_4$ because the change occurs on the saturated part of the B-H loop of Core $A_2$ and because Diode $D_2$ does not block positive volt-seconds.

Since D.C. resistance of $W_2$ is small in comparison to D.C. resistance of consumption circuit $R_L$, consumption circuit receives almost all power in positive square pulses of full duration. The next cycle repeats the above described process.

CONDITION No. 3: This condition is similar to Condition No. 2, with the addition of one control circuit, terminals 7 and 8 and D.C. voltage source C as shown in FIG. 4. D.C. voltage source C generates bias current which is limited by resistance $R_2$ and is adjusted to that magnitude and polarity which produces (−) Hc oersteds in the magnetic cores. Consequently, the reminiscence point $BR_1$ (FIG. 2) proceeds to point $B_1$ for Core $A_1$ and reminiscence point $BR_2$ proceeds to point $B_2$ for Core $A_2$. Now when power supply B delivers alternate positive and negative volt-seconds to terminal 1 and terminal 3, point $B_1$ proceeds toward point $SAT_1$ and point $B_2$ proceeds toward point $SAT_2$ in Core $A_1$ and Core $A_2$ respectively. In this condition (Condition No. 3) there occurs a swing of magnetic lines in the quantity of one half of total volt-seconds. One half of the delivered volt-seconds is absorbed by Core $A_1$ and Core $A_2$ and the remaining volt-seconds are delivered to the consumption circuit in positive square power pulses of one-half width of full duration. The theory is explained as follows: 1) Supplied volt-seconds from power supply B are constant in area and in amplitude during pulse repetition time. 2) Supplied voltseconds from power supply B, during pulse repetition time, are equal in quantity to the maximum volt-seconds which can be absorbed by Core $A_1$ and Core $A_2$ with their respective windings $W_1$ and $W_2$. 3) One half of delivered volt-seconds from power supply B is consumed by Core $A_1$ and $W_1$ during the swing on the B-H loop from point $B_1$ to point $A_1$ and from point $B_2$ to point $A_2$ for Core $A_2$ as shown in FIG. 2. The remaining one half of supplied volt-seconds are delivered to consumption circuit during the continued swing on the saturated part of the B-H loop from Point $A_1$ to point $SAT_1$ and from point $A_2$ to point $SAT_2$ for respective Cores $A_1$ and $A_2$ with windings $W_1$ and $W_2$.

CONDITION No. 4: This condition is similar to Condition No. 3 supplemented by the introduction of one additional control circuit, terminals 5 and 6, as shown in FIG. 4. A signal current is supplied through a limiting resistor $R_1$ to terminal 5, terminal 6 being either grounded or floating. When signal current is in the magnitude and polarity which produces (+) H*c* oersteds on the B-H loop, then point $B_1$ proceeds toward point $BR_1$ for Core $A_1$ and point $B_2$ proceeds toward point $BR_2$ for Core $A_2$. Consequently, consumption circuit receives power pulses of full duration. The opposite case occurs when signal current produces (−)H*c* oersteds. In that case point $B_1$ would proceed toward point $C_1$ for Core $A_1$ and point $B_2$ would proceed toward point $C_2$ for Core $A_2$ as shown in FIG. 2. A condition of zero output exists because consumption circuit receives no volt-seconds. This state can be called "cut-off" condition. This condition exists because all supplied volt-seconds from power supply B are consumed by the volt-seconds swing in Core $A_1$ with winding $W_1$ during the first pulse time of full duration and consumed by Core $A_2$ with winding $W_2$ during the following pulse time of full duration. This is true until supplied volt-seconds from the power supply B are equal or less than volt-seconds capacity of Core $A_1$ and Core $A_2$ with windings $W_1$ and $W_2$ respectively. "Full-on" time or "time of full duration" is approximately 95% of the time determined by the pulse repetition rate. This repetition rate is set up in power supply and in Core $A_1$ and Core $A_2$ design together with power windings design, and can vary from microsecond to milisecond range.

There is an indefinite number of states between "full-on" state and "cut-off" state, and any pulse width is obtainable within this range depending on the magnitude and polarity of signal current. This is true for all other control circuits and is not restricted to terminals 5 and 6. Moreover, all control circuits can be used at one time, whereby "net" effect of adding and subtracting will appear on the pulse width delivered to the consumption circuit.

The above described theory of operation is explanatory to all pulse width modes presented in the exhibits marked FIG. 4 to FIG. 17 inclusive.

In this invention control power is in microwatt or fraction of microwatt range and pulse power on consumption circuit is in watt(s) range. This means there is power amplification in addition to the function of pulse width control. This amplification exists because electromagnetic forces (EMF), equal in magnitude but opposite in direction are induced in the control windings, thereby cancelling each other and leaving control power to overcome control circuit D.C. resistance and to generate appropriate control current magnitude.

For a better understanding of the physical phenomenon of power amplification it is assumed that P.W.M. is at the state described under Condition No. 3. During positive volt-seconds supply on terminal 1 the volt-seconds swing takes place in Core $A_1$ in the following way:

$$B_1 - - - A_1 - - - SAT_1$$

Due to this change in Core $A_1$ assembly an electromagnetic force, $EMF_1$, is induced in the control winding 5,6 (FIG. 3). At the same time terminal 3 of Core $A_2$ is supplied by negative volt-seconds and current flow on terminal 3 is blocked by Diode $D_2$.

However, during the time of previous pulse duration Core $A_2$ was supplied with positive volt-seconds, and consequently, the operating point proceeded to point $SAT_2$. While volt-seconds swing $B_1 - - - A_1 - - - SAT_1$ takes place in Core $A_1$, another volt-seconds swing takes place in Core $A_2$ due to reset current in bias winding, terminals 7 and 8, in the following way:

$$SAT_2 - - - BR_2 - - - B_2$$

Due to this change in Core $A_2$ another electromagnetic force, $EMF_2$, is induced in the control windings 5,6.

These reactive forces, $EMF_1$ and $EMF_2$, are coincident in time and are equal in magnitude because of equal volt-seconds swing but are opposite in direction and thereby cancel each other. Cancellation of the reactive forces $EMF_1$ and $EMF_2$ in control winding 5,6 leaves control current or control power in the magnitude of magnetization current to supply the necessary oersteds (Hc) to shift points $B_1$ and $B_2$ for wider or narrower volt-seconds swing on the consumption circuit(s). In other control windings 7,8 . . . $(2n-1)$, $2n$ cancellation of induced electromagnetic forces, in principle, is the same as that described above. However, magnitude of these electromagnetic forces can be different and therefore in winding 7,8 (FIG. 3) are designated as $EMF_3$ and $EMF_4$.

What is claimed as new and useful to be secured by Letters-Patent of the United States is:

1. Electrical pulse width modulating device comprising at least two saturable magnetic cores; at least two diodes; electrical conductive wire;

said elements assembled to comprise a device which has first input means consisting of at least two terminals to receive alternate polarity power pulses from external power supply and second input means consisting of at least two terminals to receive d.c. as well as variable frequency signals and output means consisting of at least two terminals for tranferring current flow to the consumption circuit means;

said elements assembled as follows: at least two saturable magentic cores, each core having conductive winding means, herein called power winding means, wrapped around each core resulting in two terminals for each power winding and at least two terminals for each core, each said power winding having a diode coupled in series and in proper polarity in respect to the polarity of power winding to permit current flow in one direction in power winding means; each power winding-diode arrangement serving as first input means and as output means where one said terminal coupled to external power supply means, called first input means, receives alternate polarity power pulses and the opposite terminal, called output means, transfers width modulated power pulses to consumption circuit means;

said cores, power windings, and diodes combined into an assembly having at least two terminals which serve as first input means and at least two terminals which serve as output means; the signal receiving means, herein called control winding means, wrapped around said assembly in a manner resulting in control winding means being capable of generating magnetic flux in said magnetic cores whereby incoming signal to control winding means controls the extent of magnetic saturation of said magnetic cores in a manner that the product of volts and time received at first input means from external power supply means is controlled in respect to time factor and pulse width modulation is achieved therein;

the assembly as herein described transfers from said externally coupled power supply means to the consumption circuit means electrical power pulses modulated in width by incoming signals to control winding means and transfers said electrical power pulses corresponding in pulse polarity and pulse sequence to the requirements of the consumption circuit, which pulse polarity and pulse sequence are achieved by appropriate interconnection of this pulse width modulator's terminals to external power supply means and to consumption circuit means.

* * * * *